United States Patent Office 2,917,499
Patented Dec. 15, 1959

2,917,499

TRIALKYLIDENECYCLOBUTANES AND POLYMERS THEREOF

Harry Norman Cripps, Hockessin, and John Kendall Williams, Wilmington, Del., assignors to E. I. du Pont de Nemours and Company, Wilmington, Del., a corporation of Delaware No Drawing. Application November 29, 1956
Serial No. 624,993

12 Claims. (Cl. 260—93.1)

This invention relates to cyclic hydrocarbons having three double bonds, to their polymers and to methods for preparing the same.

Unsaturated hydrocarbons are useful in many applications. They are particularly useful for the preparation of polymers which can be formed into films, fibers, and coating compositions. One of the factors contributing to the properties of the final polymer is the particular structure of the monomer from which it is made.

It is an object of this invention to prepare new unsaturated monomers in order to obtain polymers having novel and improved properties. A further object is to prepare such polymers forming solvent resistant films.

The novel products of this invention are hydrocarbons having three ethylenic double bonds in conjugated relationship. Each pair of double bonds is attached to a carbon atom of a four-membered ring. One annular carbon atom of said ring bears a methylene substituent, an adjacent annular carbon bears an alkylidene substituent having at least one hydrogen atom on the carbon that is attached to said ring, and the other adjacent annular carbon atom bears a single carbon hydrocarbon substituent and a double bond (cyclic or exocyclic). The remaining annular carbon atom is unsubstituted. This invention includes the polymers of such compounds and especially the dimers.

The monomeric and dimeric products of this invention have the following general formulas:

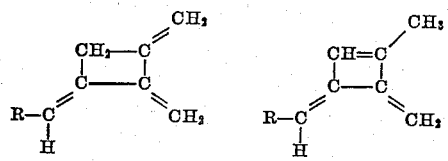

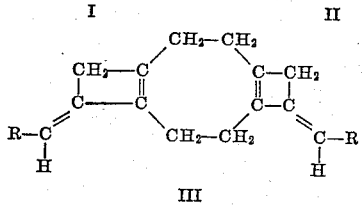

or

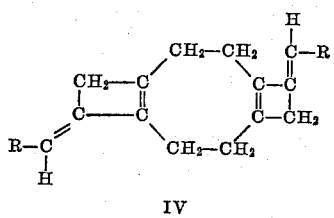

wherein R is hydrogen, or a monovalent hydrocarbon radical free of aliphatic unsaturation, i.e., alkyl, cycloalkyl, and aryl.

The products of this invention are prepared by pyrolyzing a 3-alkylidenecyclobutane-1,2-bis(methyltrimethylammonium hydroxide) of the formula

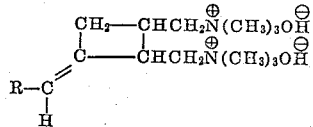

wherein R has the meaning defined above.

The temperature and pressure at which the pyrolysis of the bis-quaternary ammonium hydroxide is carried out are not critical. Temperatures ranging from 100° to about 200° C. are satisfactory. The use of lower temperatures requires heating for undesirably long periods. Preferably the pyrolysis is carried out at temperatures of 125–150° C. under reduced pressures, e.g., at 5–10 mm. mercury. However, atmospheric or superatmospheric pressures can be used during pyrolysis. The pyrolysis temperature and pressure are preferably controlled so that a steady, rapid decomposition of the bis-quaternary ammonium hydroxide takes place.

The pyrolysis products are volatile and are collected in a trap cooled to about −80° C. or lower. Pyrolysis is continued until there is no more bis-quaternary ammonium hydroxide remaining in the pyrolysis vessel. The resulting trialkylidenecyclobutane can be isolated by dissolving the frozen pyrolysis product of the trap in an inert solvent, such as diethyl ether. The ether solution is washed with cold water and then dried over a desiccating agent, such as anhydrous magnesium sulfate for a few minutes. The ether is removed by subjecting the solution to 5–10 mm. mercury pressure. The residue obtained on evaporation of the ether is rapidly distilled without application of heat at a pressure of 1–5 mm. of mercury into a receiver cooled to −80° C. The resulting trialkylidenecyclobutane is stable at this temperature.

As indicated above, the trialkylidenecyclobutanes of this invention can be stored at temperatures of −80° C. or lower. However, at ordinary temperatures, i.e., 0–30° C., they rearrange spontaneously, with evolution of heat to 1-methyl-3,4-dialkylidene-1-cyclobutenes

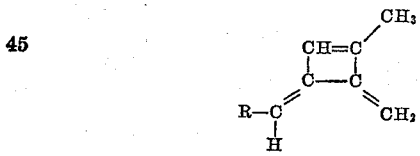

and to the dimers described above.

The dimers, which are obtained spontaneously from the trialkylidenecyclobutanes, are readily polymerized by means of air to polymers which are insoluble in organic solvents.

The 3-alkylidenecyclobutane-1,2-bis(methyltrimethylammonium hydroxides) used as starting materials in the process of this invention can be made by known methods from certain allenes and maleic anhydride. Allenes having the formula

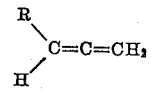

wherein R is hydrogen, alkyl, cycloalkyl or aryl, are reacted with maleic anhydride at a temperature of 150–250° C. in the absence of a polymerization initiator. Preferably the reaction is held in the presence of a polymerization inhibitor, to form 3-alkylidene (or aralkylidene) cyclobutane-1,2-dicarboxylic acids. These dicarboxylic acids can be rearranged by treatment with aqueous base at ordinary or elevated temperatures, followed by acidification to 3-hydrocarbo-2-cyclobutene-1,2-dicarboxylic acids (U.S. Patent No. 2,848,478).

For example, allene and maleic anhydride can be heated in benzene solution in the presence of hydroquinone for 8 hours at 225° C. to form 3-methylenecyclobutane-1,2-dicarboxylic anhydride. This anhydride is then heated with a 16% aqueous solution of sodium hydroxide under reflux for four hours. The resulting solution is acidified with hydrochloric acid, heated to 80–90° C. for ½ hour and finally cooled to precipitate 3-methyl-2-cyclobutene-1,2-dicarboxylic acid.

The 3-hydrocarbo-2-cyclobutene-1,2-dicarboxylic acid can be converted to the acid chloride by treatment with thionyl chloride and the acid chloride then converted to the bisdimethylamide by reaction with dimethylamine. The resulting bisdimethylamide can be reduced to the bis(methyldimethylamine) by means of lithium aluminum hydride in ether. Finally the bis(methyldimethylamine) is treated with methyl iodide in absolute ethanol to form the 3 - alkylidenecyclobutane - 1,2 - bis(methyltrimethyl-ammonium iodide). The quaternary ammonium salt is converted to the bis-quaternary ammonium hydroxide by treatment with an aqueous suspension of excess silver oxide at room temperature. After removal of the silver halide and excess oxide by filtration, the resulting aqueous solution of 3 - alkylidenecyclobutane - 1,2 - bis(methyltrimethylammonium hydroxide) can be used directly in the process of this invention.

The products and process of this invention are illustrated in further detail in the following examples in which the proportions of ingredients are expressed in parts by weight unless otherwise noted.

*Example 1*

A mixture of 46.6 parts of 3-methylenecyclobutane-1,2 - bis(methyltrimethylammonium iodide) (prepared as described above), 250 parts of water, and washed silver oxide prepared from 85 parts of silver nitrate and an equivalent amount of sodium hydroxide, is stirred for 18 hours at room temperature protected from the atmosphere by a soda-lime tube. The silver salts are removed by filtration, and the filtrate is concentrated by distillation on a steam bath at 5–10 mm. mercury pressure.

An electric heating mantle is substituted for the steam bath and heating is continued at a rate that causes steady decomposition of the quaternary ammonium hydroxide under a pressure of 5–10 mm. of mercury. The distillate is collected in a trap cooled to −80° C. by a mixture of acetone and solid carbon dioxide.

After decomposition is complete and there is no quaternary ammonium hydroxide left in the reaction vessel, 142 parts of diethyl ether and 0.1 part of phenothiazine are added to the frozen distillate that has collected in the cold trap. The product in the trap is allowed to warm to room temperature. The ether layer is separated, washed with cold water, and dried over anhydrous magnesium sulfate for about five minutes. The ether is removed by subjecting the solution to a pressure of 5–10 mm. mercury and the liquid that remains is distilled at 1–5 mm. into a trap cooled to −80° C. The product distills at this pressure without application of external heat. There is obtained 2 parts of trimethylenecyclobutane which crystallizes upon storage at −80° C.

The proton magnetic resonance spectrum of a sample of the cold trimethylenecyclobutane is consistent with the assigned structure, but changes rapidly during an exothermic reaction that takes place as the specimen warms to near room temperature.

Two other samples of the product of Example 1 are dissolved while still cold in carbon tetrachloride and carbon disulfide, respectively, and the infrared spectra of the resulting solutions are measured. Bands are observed at 3.26, 3.37, 3.47, 5.68, 5.95, 6.18, 7.16, 7.24, and 11.36 microns.

*Example 2*

A sample of trimethylenecyclobutane is prepared essentially as described in Example 1 from 233 parts of 3 - methylenecyclobutane - 1,2 - bis(methyltrimethylammonium iodide) and moist silver oxide. The washed and dried ether solution of trimethylenecyclobutane is allowed to stand at room temperature overnight and is then distilled at reduced pressure. The first fraction, boiling at 56–58° C./150 mm. and amounting to 4 parts, is 1-methyl-3,4-dimethylenecyclobutene,

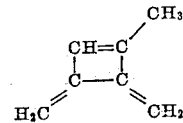

The proton magnetic resonance spectrum of this product is consistent with the structure shown by the above formula. The infrared absorption spectrum exhibits bands at 3.26, 5.89, 6.07, 6.40, 7.21, 11.22, and 11.68 microns. The ultraviolet absorption spectrum of this product shows two bands; $\lambda_{max.}$ 2450, K–57 and $\lambda_{max.}$ 2100, K–379.

The second fraction obtained on distillation of the reaction mixture of Example 2 boils at 129–135° C./10 mm. and amounts to 12 parts. Redistillation of this material gives 10 parts of trimethylenecyclobutane dimer boiling at 121–123° C./10 mm. and melting at about 0° C., and having the formula:

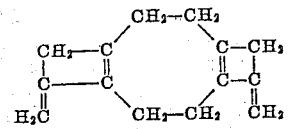

or

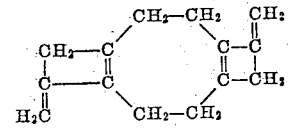

The proton magnetic resonance spectrum of this dimer agrees with the structures shown by the above formulas. The infrared absorption spectrum exhibits bands at 3.23, 5.95, 6.17, 11.33, and 11.77 microns.

*Analysis.*—Calc'd for $C_{14}H_{16}$: C, 91.23%; H, 8.77%; mol. wt., 184.27. Found: C, 91.00%; H, 8.68%; mol. wt., 188, 190.

A portion of the trimethylenecyclobutane dimer obtained as fraction II in Example 2 is spread on a glass plate and the coated plate is exposed to the air at room temperature. This coating rapidly (⅓ minute) forms a transparent film which is insoluble in benzene.

The following bis-quaternary ammonium hydroxides can be substituted for the 3-methylenecyclobutane-1,2-bis(methyltrimethylammonium hydroxide) of Example 1 and can be pyrolyzed in the manner described in that example: 3-ethylidene-, 3-n-butylidene-, 3-n-hexylidene-, 3-n-decylidene-, 3-n-octadecylidene-, 3-(phenylmethylene)-, 3-(p-tolylmethylene)-, and 3-(cyclohexylmethylene) cyclobutane-1,2-bis(methyltrimethylammonium hydroxides). The trialkylidenecyclobutanes obtained from these specific quaternary ammonium hydroxides are 3-ethylidene-, 3-n-butylidene-, 3-n-hexylidene-, 3-n-decylidene-, 3 - n - octadecylidene-, 3 - phenylmethylene-, 3-p - tolylmethylene-, and 3 - cyclohexylmethylene - 1,2-dimethylenecyclobutanes respectively, which dimerize spontaneously at ordinary temperatures to the dimers of the respective 3-alkylidene-1,2-dimethylenecyclobutanes. The corresponding dialkylidenecyclobutenes obtained are 3-ethylidene-, 3-n-butylidene-, 3-n-hexylidene-, 3-n-decylidene-, 3-n-octadecylidene, 3-phenylmethylene, 3-p-tolyl-methylene-, 3 - cyclohexylmethylene - 1 - methyl - 4 - methylene-1-cyclobutenes, respectively.

The products of this invention are particularly useful in coating compositions for application to glass, metal, or wood surfaces to provide coatings which can be rapidly converted by air, without addition of a drier, to solvent-resistant coatings.

We claim:

1. A process comprising pyrolyzing a 3-alkylidenecyclobutane-1,2-bis(methylquaternary ammonium hydroxide) to form cyclic hydrocarbons.
2. The process of claim 1 wherein the pyrolysis is carried out at temperatures of 100–200° C.
3. The process of claim 1 wherein the quaternary ammonium hydroxide is the trimethyl ammonium hydroxide.
4. Trimethylenecyclobutane.
5. Trimethylenecyclobutane dimer.
6. A hydrocarbon having three ethylenic double bonds in conjugated relationship, each pair of double bonds being attached to a carbon atom of a four-membered ring, one annular carbon atom of said ring bearing a methylene substituent, an adjacent annular carbon bearing an alkylidene substituent having at least one hydrogen atom on the carbon that is attached to said ring, and the other adjacent annular carbon atom bearing a single carbon hydrocarbon substituent and a double bond, the remaining annular carbon atom being unsubstituted.
7. 1-methyl-3,4-dimethylenecyclobutene.
8. 3-alkylidene-1,2-dimethylenecyclobutanes.
9. 3-alkylidene-1,2-dimethylenecyclobutane dimers.
10. 3-alkylidene-1-methyl-4-methylenecyclobutenes.
11. Homopolymers of 3-alkylidene-1,2-dimethylenecyclobutane dimers.
12. Homopolymers of a hydrocarbon as set forth in claim 6.

References Cited in the file of this patent

Alder et al.: Chem. Berichte, vol. 87, 1954, pp. 1567–1571, also Chem. Abstracts, vol. 49, 1955, p. 14715F.

Howton et al.: Jour. Amer. Chem. Soc., vol. 78, August 20, 1956, pp. 4011–4012.

Applequist et al.: Jour. Amer. Chem. Soc., vol. 78, August 20, 1956, pp. 4012–4022.

UNITED STATES PATENT OFFICE

CERTIFICATE OF CORRECTION

Patent No. 2,917,499           December 15, 1959

Harry Norman Cripps et al.

It is hereby certified that error appears in the printed specification of the above numbered patent requiring correction and that the said Letters Patent should read as corrected below.

Column 1, line 33, for "in alkylidene" read -- an alkylidene --; column 2, line 21, after "hydroxide takes place." insert the following sentence: -- It is often desirable to employ mechanical agitation of the reaction mixture during the pyrolysis in order to obtain a more steady rate of decomposition. --; line 40, beginning with "However, at ordinary temperatures," strike out all to and including "described above." in line 50, same column; column 4, line 58, for "3-n-octadecylidene," read -- 3-n-octadecylidene-, --; line 71, for "3-n-octadecylidene, 3-phenylmethylene," read -- 3-n-octadecylidene-, 3-phenylmethylene-, --.

Signed and sealed this 19th day of July 1960.

(SEAL)
KARL H. AXLINE
Attesting Officer

ROBERT C. WATSON
Commissioner of Patents